June 22, 1965

P. BERRYER 3,190,072

TURBINE ENGINE

Filed Oct. 20, 1964

INVENTOR.

Pierre Berryer.

3,190,072
TURBINE ENGINE
Pierre Berryer, 141—45 85th Road, Apt. 4B,
Jamaica, N.Y.
Filed Oct. 20, 1964, Ser. No. 405,170
4 Claims. (Cl. 60—40)

This invention relates generally to the construction of engines, and more specifically to the construction of an oil driven turbine engine.

The engine to be disclosed converts heat energy into mechanical energy by means of a turbine wheel. Conventional turbine engines involve combustion of gases and operate at exceedingly high temperatures. I have designed an engine which will operate at a relatively low temperature and is substantially noiseless. The concept behind the operation of this engine is in the utilization of liquid oil for driving the turbine, the said oil being greatly accelerated by the injection of small quantities of water which instantly change into steam and expand due to the operating temperature of the oil introduced into the turbine nozzle.

It is therefore a primary object of my invention to provide a quiet running engine which operates efficiently at low temperature and where there are a minimum of moving parts.

It is a further object of this invention to provide a turbine engine of the above class which is simple and economical to construct and is suitable for use in all instances where rotational mechanical power is required.

A full understanding of the construction of this invention, together with further novel features and advantages, will be had from the following detailed description of a preferred embodiment thereof, taken in conjunction with the attached drawings wherein.

Similar reference characters indicate corresponding parts throughout the several views in the drawings.

Figure 1:
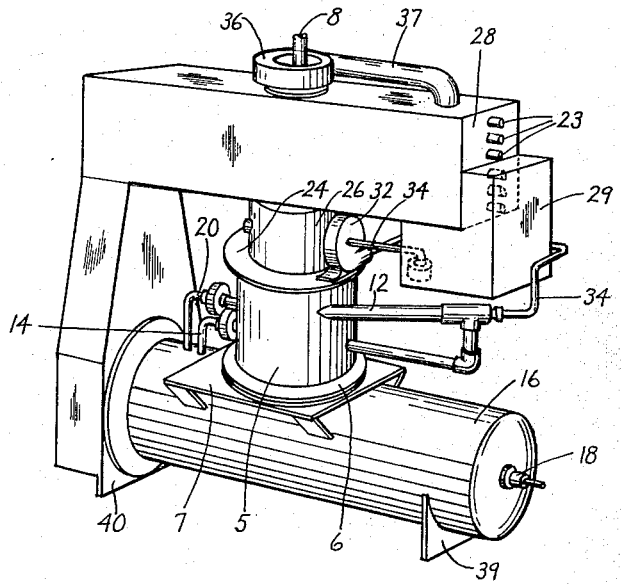
FIG. 1 is a perspective view of the engine in the fully assembled condition.
Figure 2:
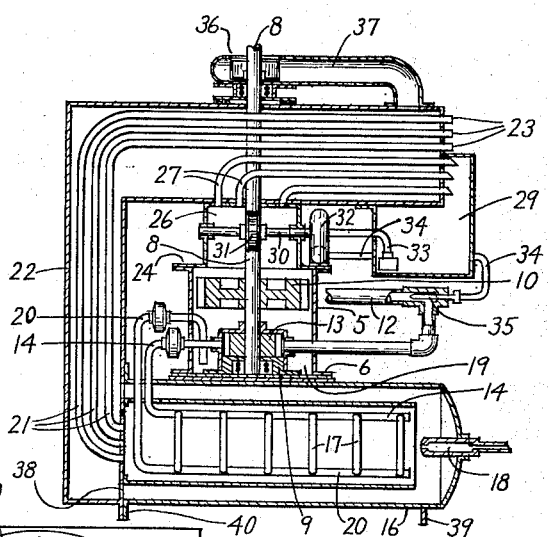
FIG. 2 is a cross sectional side elevation of the engine.
Figure 3:
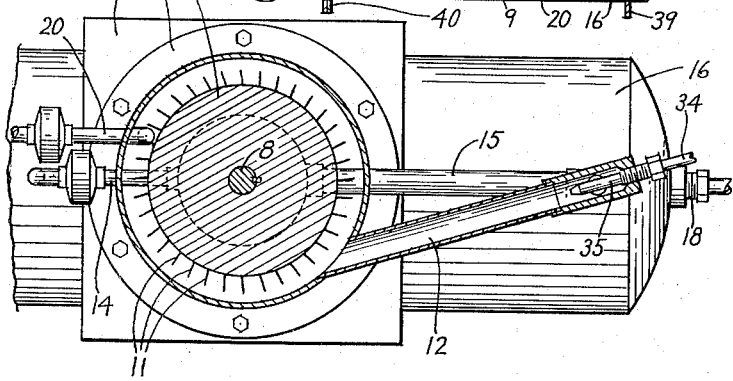
FIG. 3 is a fragmentary cross sectional plan view of the engine showing the turbine and associated nozzle construction.

Referring now to the drawings in detail, the numeral 5 represents a vertical cylindrical housing having a lower flange 6 which supports the housing on a platform 7. Mounted to extend vertically through the housing is a driven shaft 8 which is seated at its lower end in a bearing 9 and extends upwardly to terminate outwardly of the engine with a suitable pulley or gear drive means not shown on the drawing. Mounted within the upper portion of the housing 5 is a turbine wheel 10 having radially extending blades 11 projecting from the periphery of the wheel. The wheel is suitably keyed on the shaft 8 and is aligned with a tangential nozzle 12 which introduces the mixture of oil and steam to drive the wheel. Mounted below the turbine wheel and connected to the drive shaft is a gear pump 13 having an intake pipe 14 and a pressurized outlet pipe 15.

Positioned horizontally beneath the housing 5 is an oil heating cylinder 16. The intake pipe 14 enters the cylinder 16 and is heated by a number of connecting pipes 17 by a burner jet 18 located in one end of the cylinder. The oil supply is taken from a sump 19 which is formed by the lower end of the housing 5 through a pipe 20 which enters the oil heating cylinder 16 and communicates with the intake pipe 14 through the connecting pipe 17. Exhaust gases from the burner jet 18 are vented through pipes 21 which extend in a parallel spaced relationship through an L shaped heat exchanger 22 and thence outwardly through ports 23 to atmosphere. The heat exchanger 22 is supported on one end of the oil heating cylinder opposite to the burner jet 18 and extends vertically within a substantially rectangular casing above the level of the housing 5. The exchanger then extends horizontally in a vertically spaced manner above the housing 5 and heating cylinder 16 to form a compact engine construction.

The upper flange 24 of the housing 5 supports a short cylindrical steam trap 26 which communicates with the horizontal portion of the heat exchanger 22 through a number of pipes 27 which extend towards the end 28 where they feed condensed water into a supply tank 29 mounted conveniently beneath the end 28 of the exchanger. Extending diametrically through the steam trap 26 is a horizontal shaft 30 which is driven by a suitable worm drive 31 from the drive shaft 8 and operates a water pump 32 disposed outwardly and adjacent the steam trap. The water pump withdraws water through a pipe 33 which extends into the supply tank 29 and pumps it at pressure through a pipe 34 which terminates with an injection nozzle 35 located in the outer end of the larger tangential nozzle 12 which drives the turbine.

Cooling air is withdrawn from the atmosphere by a rotary impellor 36 which is mounted on the shaft 8 on the top of the heat exchanger. Air passes through a duct 37 and enters the exchanger 22 adjacent the end 28 thereof. The cooling air circulates around the several pipes within the exchanger, condensing water in the steam pipes 27, and passes into the combustion chamber of the jet 18 through an opening 38 in the heat exchanger 22. Thus, the air, while cooling the condenser pipes 27, is preheated thereby and by the exhaust pipes 21, to more efficiently support combustion of the fuel entering the burner jet 18. The engine is conveniently supported with the drive shaft in a vertical plane by means of a flange 39 which supports one end of the oil heating cylinder 16, and a short extension 40 to the heat exchanger casing located at the other end of the oil heating cylinder.

In operation, oil is heated in the cylinder 16 by means of a burner 18 to a temperature in excess of 300 degrees Fahrenheit. The heated oil is driven by the gear pump 13 and introduced into one end of the tangential nozzle 12. At this point small quantities of water are introduced through the injection nozzle 35. The introduction of water at this temperature causes an instantaneous formation of steam which forces the oil with considerable acceleration down the nozzle 12 to engage with the blades 11 of the turbine wheel 10. The turbine wheel thus rotates and the oil falls into the sump 19 whilst the steam separates therefrom and rises into the steam trap 26 where it passes outwardly through the pipes 27 for condensation within the heat exchanger 22 and ultimate return to the water supply tank 29. Cooling air for the heat exchanger is provided by the impellor 36 which is driven by the drive shaft 8, and similarly water pressure for injection into the tangential nozzle 12 is provided by a pump 32 also driven by the main drive shaft 8. This engine will perform efficiently within a large range of engine speed and power control is most easily effected by controlling the quantity of water which is being introduced through the injection nozzle 35. It should be pointed out that this engine cannot be classified as a steam turbine since the steam merely performs to accelerate the motion of the oil, and it is the impact and inertia of the oil that drives the turbine blades.

From the foregoing, it is believed that the construction, operation and advantages of this invention will be fully apparent. However, since numerous modifications will occur to those skilled in the art, it is not desired to limit the construction exactly to that shown and described, and accordingly, modifications and equivalents may be resorted to, falling within the scope of the appended claims.

I claim:

1. An oil driven turbine engine, comprising, a vertical cylindrical housing, a drive shaft extending concentrically through the housing, a bladed turbine wheel mounted on the shaft in an upper portion of the housing, a gear pump operated by the shaft in a lower portion of the housing, said lower portion forming a sump and containing a supply of oil, a nozzle entering the side of the housing and directed towards the turbine blades, an oil heating cylinder, said pump drawing oil from the sump and through the heating cylinder and outwardly through the nozzle against the turbine blades, a water supply tank, an injector nozzle for introducing water into the first nozzle, and a heat exchanger for condensing steam formed by the introduction of water into the heated oil.

2. An oil driven turbine engine according to claim 1, wherein a second pump is mounted adjacent the water supply tank and driven by the drive shaft to provide pressure to inject water through the injector nozzle.

3. An oil driven turbine engine according to claim 1, wherein said heat exchanger is cooled by an impeller driven by the drive shaft and wherein the exhaust gases from the oil heating cylinder pass through the heat exchanger and thence outwardly to atmosphere.

4. An oil driven turbine engine, comprising, a vertical cylindrical housing, a cylindrical steam trap mounted above the housing and communicating with the housing, a drive shaft extending vertically through the housing and steam trap, a bladed turbine wheel mounted on the shaft and disposed in an upper portion of the housing, a gear pump driven by the shaft and disposed in a lower portion of the housing, oil contained in said lower portion, a nozzle entering the housing and directed tangentially towards the blades, an oil heating device, said pump pumping oil through the heating device and under pressure into said nozzle, a water injector nozzle communicating with the first nozzle outwardly of the housing, a supply of water for introduction to the heated oil through the injector nozzle and forming steam, and a heat exchanger for condensing the steam collected by the steam trap.

References Cited by the Examiner
UNITED STATES PATENTS

| | | | |
|---|---|---|---|
| 1,162,052 | 10/15 | Hall | 60—56 |
| 2,151,949 | 3/39 | Turner | 60—40 |

JULIUS E. WEST, *Primary Examiner*.